United States Patent [19]

Fleischman

[11] Patent Number: 5,613,918
[45] Date of Patent: Mar. 25, 1997

[54] BIDIRECTIONAL TORQUE RESPONSIVE BELT TENSIONER

[76] Inventor: Daniel G. Fleischman, 209-A Farnsworth Rd., Waterville, Ohio 43566

[21] Appl. No.: 418,220

[22] Filed: Apr. 6, 1995

[51] Int. Cl.$^6$ ........................................ F16H 7/12
[52] U.S. Cl. .................. 474/134; 280/237; 280/241; 280/261
[58] Field of Search ............... 474/56, 101, 106–108, 474/124, 134; 280/261, 237, 241

[56] References Cited

U.S. PATENT DOCUMENTS

| | | | |
|---|---|---|---|
| 611,170 | 9/1898 | Howard | 474/134 |
| 1,108,085 | 8/1914 | Sewall. | |
| 1,257,660 | 2/1918 | Willis. | |
| 1,764,767 | 6/1930 | Wilhelm. | |
| 1,828,769 | 10/1931 | Duhamel. | |
| 2,776,575 | 1/1957 | Michie. | |
| 3,608,387 | 9/1971 | Fox. | |
| 3,611,822 | 10/1971 | Sanderson. | |
| 3,808,899 | 5/1974 | Cooper | 74/203 |
| 3,834,721 | 9/1974 | Gobby | 280/7.15 |
| 4,227,589 | 10/1980 | Chika | 280/209 X |
| 4,373,926 | 2/1983 | Fullerton | 474/56 |
| 4,781,663 | 11/1988 | Reswick | 474/56 X |
| 4,946,426 | 8/1990 | Leonard | 474/101 |
| 5,221,236 | 6/1993 | Raymer. | |

*Primary Examiner*—Roger J. Schoeppel
*Attorney, Agent, or Firm*—Jim Zegeer, Esq.

[57] ABSTRACT

This invention relates to the field of power transmission, and more specially, to a torque responsive belt tensioner for a friction belt. Because of recent concerns for the ecology of our planet there has been a resurgence of interest in human powered vehicles (HPV). This category incudes two, three and four-wheeled vehicles. The invention answers the need-for a power transmitting apparatus that will:

a) provide forward motion,
b) provide a coasting mode,
c) provide a braking action,
d) provide a reverse.

The belt drive tensioner of this invention is lightweight and simple. It includes a rigid backing plate and idler carrier positioned on a drive shaft adjacent to a drive pulley. Two belt engaging members, rollers, or perpendicular columns or projections of sufficient height to contact the exterior surface of the drive belt are carried by the rigid backing plate. They are located outside the circumference of the drive pulley, one in contact with the exterior of the incoming belt, one in contact with the exterior of the belt as it leaves the drive pulley. A surface on the backing and idler carrier is designed to mate with the face of the drive pulley, the friction produced between the two surfaces transfers rotational energy from drive pulley to the backing. As the backing rotates, a column or idler roller wraps the normally slack belt around the drive pulley engaging the belt. When power is released, the belt slackens and the driven pulley can freewheel. Applying power in the opposite direction will engage the opposite column and provide either a braking action or a reversing action.

10 Claims, 5 Drawing Sheets

BIDIRECTIONAL TORQUE RESPONSIVE BELT TENSIONER

This invention relates to the field of power transmission and more specially to a torque responsive belt tensioner for a belt drive. Because of recent interest in the ecology of our planet there has been a resurgence of interest in human powered vehicles (HPV). This category includes lightweight two, three and four-wheeled modes of transportation. This invention also offers features to the children peddle car market that have been absent until now. The drive can also replace the noisy and polluting gasoline engines used on go-carts.

While the embodiment disclosed herein relates to use in a human powered vehicle, it is clear that the broader aspects of the invention are not restricted to such applications and can be applied to low-speed electric and gasoline-powered drives.

BACKGROUND OF THE INVENTION

The belt drive under discussion are those that rely upon friction to transfer power and not mechanical means such as teeth on the belt and pulley. The belt drive system of power transmission was one of the earliest methods of transmitting rotational energy from one location to another and is still widely used today.

Two factors which must be present for any drive to work properly are:

1. There must be sufficient surface contact area between belt and pulley so that the gripping force of the drive is greater than the resistance of the load.
2. There must be sufficient tension on the belt to maintain that surface contact. When this condition is met, the belt will tend to pull itself into the groove.

If we reflect on these elements it becomes apparent that to raise drive efficiency, increasing belt contact is preferable over increased belt tension. Multiple belts and wrapping the belt around the pulley are two methods that depend on this element.

Belt tension does play an important role in the operation of these devices, for without tension there would be little surface contact, excessive slippage between drive pulley and drive belt would occur. Therefore, only minor resistance would totally defeat the transfer of power. This factor can also be used as a plus when a neutral or free wheeling mode is desired.

According to the invention an ideal belt tensioner would possess the following characteristics:

a. capable of engaging belt in either clockwise or counter-clockwise directions,
b. capable of automatically disengaging (free-wheeling),
c. lightweight, and
d. simple and reliable.

THE PRIOR ART

The problem of proper belt tension has been addressed by many inventors over the years, their devices probably worked well for the particular application for which they were designed. These same devices either possessed or lacked elements that made them unsuitable for other applications. As we broach the subject of prior art, it will become increasingly clear that no prior art possess all of the elements or attributes or advantageous features of this invention.

A patent issued to James H. Sewall U.S. Pat. No. 1,108,085 uses levers and weights to tension the belt. The weights are the objectionable elements in this invention.

Michael Duhamel Roubaix 1,828,769 (France) shows an invention utilizing a spring to supply tension force. Although this device will transmit power in both directions, there is no free-wheeling mode.

George M. Willis U.S. Pat. No. 1,257,660 uses leavers and idler wheels to tighten a belt, however, the idlers are placed inside the belt loop this decreasing belt wrap.

Harold F. Wilhelm U.S. Pat. No. 1,764,767 is a device using a gear to offset the drive pulley, but is too complicated and too heavy for lightweight applications.

Centrifugal force is the energy behind Anthony Fox U.S. Pat. No. 3,608,387. However, this invention will not work in human drive application because of the number of RPMs required.

John S. Michie U.S. Pat. No. 2,776,575 employs a spring to exert pressure on one side of the drive pulley forcing the belt toward the outside circumference, thus tightening the belt. This invention also lacks a free-wheeling mode.

Martin I. Sanderson U.S. Pat. No. 3,611,822 is complicated, only unidirectional and requires a lowering of the gear ratio.

Attempts to use friction in a belt transmission have been largely too complicated and weighty. U.S. Pat. No. 3,808,899 to Edward F. Cooper is an example of this complexity.

Matthew C. Raymer U.S. Pat. No. 5,221,236 is a belt drive apparatus intended for human power, this drive also lacks the ability to disengage or coast.

OBJECTS AND ADVANTAGES

The object of this invention is to accomplish the following:

(a) To provide a belt tensioner that will engage the drive belt when either clockwise or counter-clockwise energy is applied.
(b) To provide a state of neutral, effectively disengaging the driven pulley from the drive pulley, thus allowing the driven pulley to free-wheel.
(c) To increase belt wrap for maximum surface contact, thus increasing load pulling capability.
(d) To provide guides for the purpose of retaining the belt in the free-wheeling mode.
(e) To provide a tensioner that will automatically compensate for belt wear.
(f) To provide a tensioner that requires no RPM build-up, such as required with centrifugal clutches.
(g) To provide a device that needs only the existing drive shaft for mounting.
(h) To provide a tensioner that responds instantly to torque and direction.
(i) To provide a device that is simple and light, free from heavy complicated gears and housings.
(j) To provide a tensioner that will work equally as well with a fixed pulley or variable pitch sheave.
(k) To provide a device for drive belt tensioning that does not require a lowering of the drive gear ratio.

DESCRIPTION OF THE DRAWINGS

Further objects, advantages and features of the invention will become apparent from a consideration of the drawings and ensuing description wherein.

DETAILED DESCRIPTION OF THE INVENTION

As discussed above, the invention is particularly applicable as a drive for lightweight two and three wheeled vehicle modes of transportation, but it is clear that the broader aspects of the invention are not restricted to such application but can include other drive applications.

Referring collectively to the drawings, a multi-wheeled vehicle, particularly a children peddle car vehicle having wheels W, on the left and right side, the drive in this application being applied to the right rear wheel. The front wheels are coupled to a steering mechanism (not shown) which is actuated from a steering wheel SW. A seat S is provided for the passenger and a hand operated emergency brake mechanism BM brake shoes that can engage both of the rear wheels W for an emergency braking operation. As will be described later herein, the braking action can also be accomplished through manipulation of the drive mechanism. A windshield WI is provided for the driver.

Figure 1:
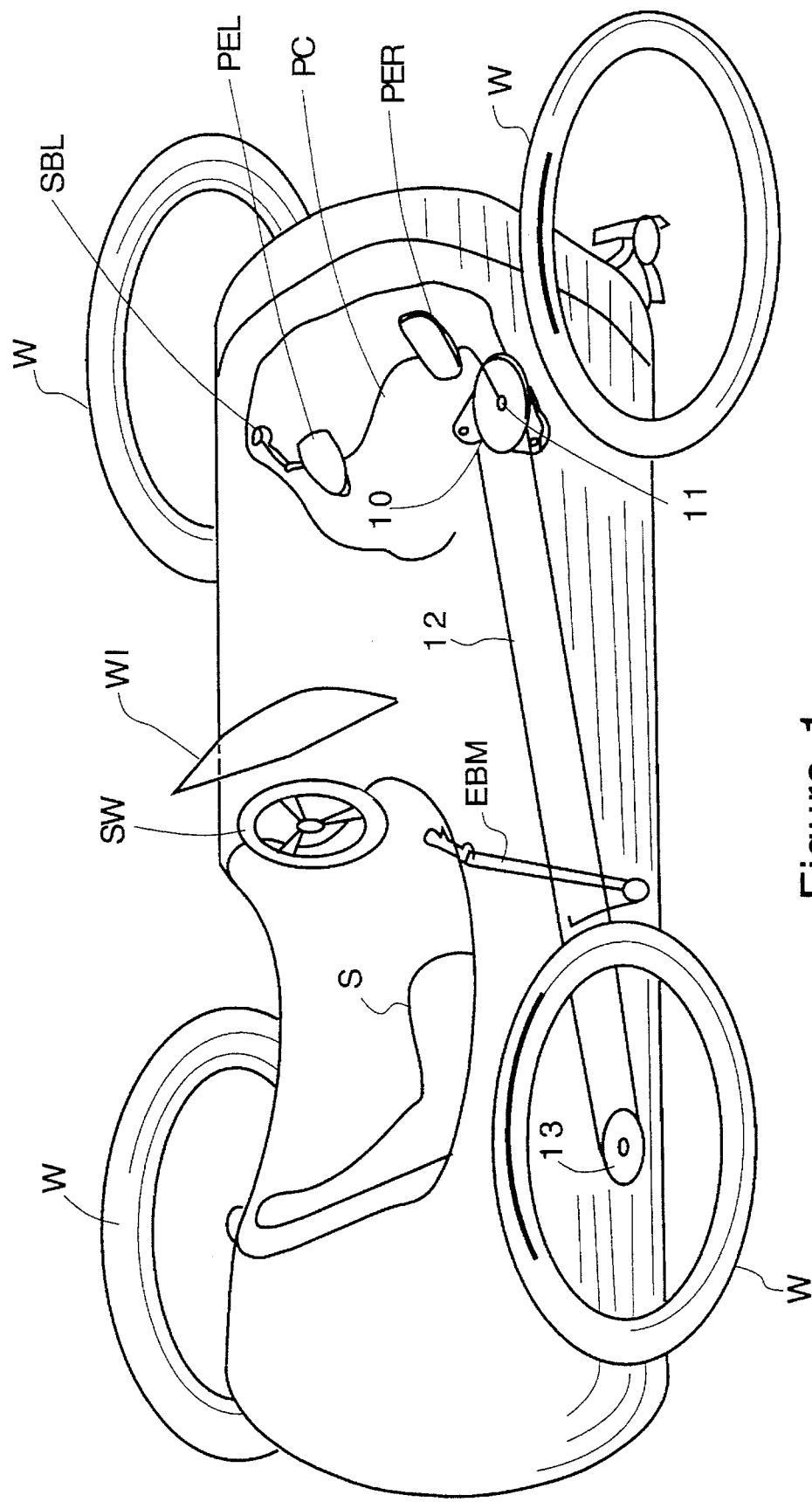
FIG. 1 is an isometric view of a human-powered vehicle incorporating the invention.
Figure 2:
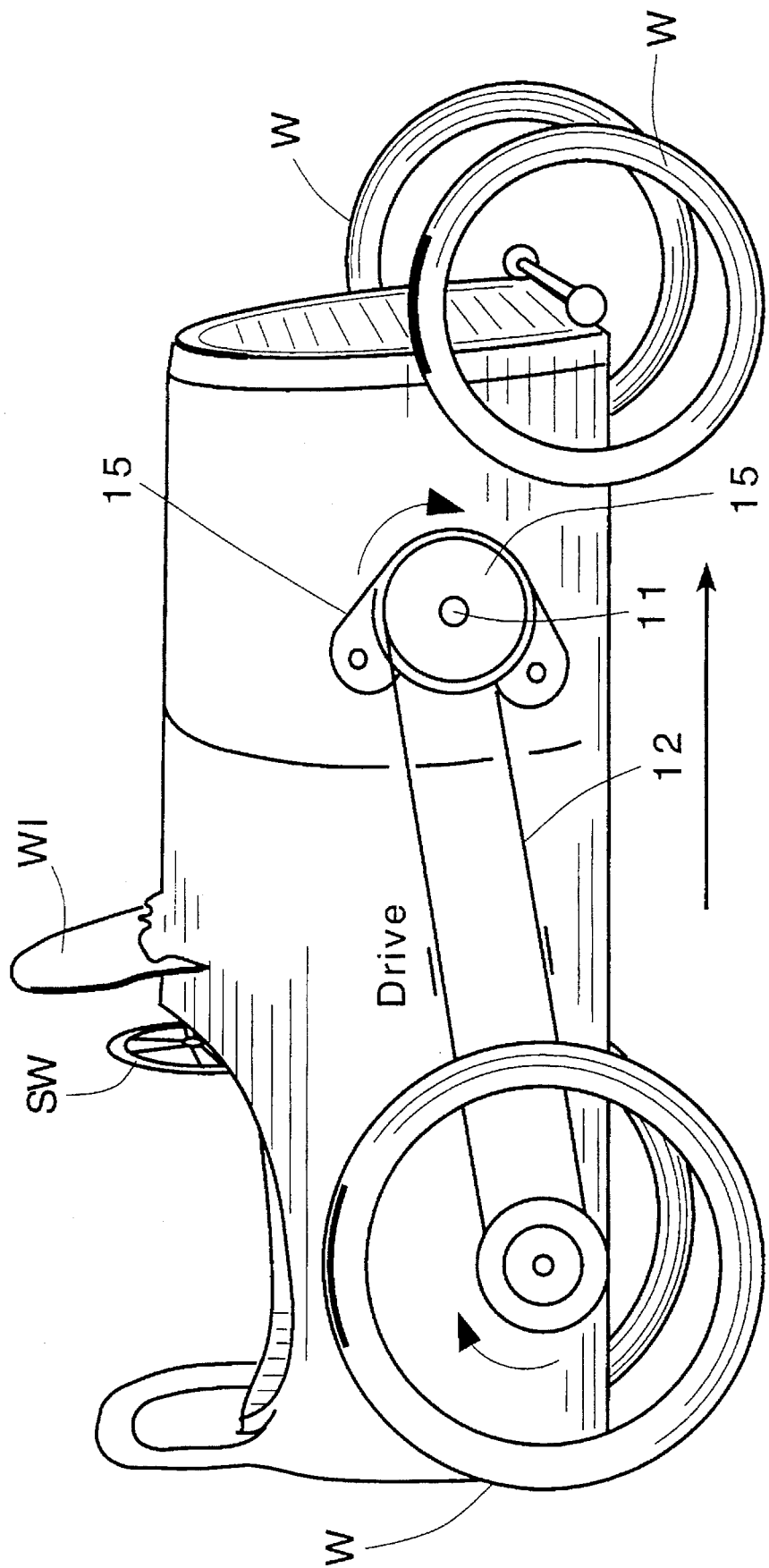
FIG. 2 is a side elevational view of the vehicle shown in FIG. 1 incorporating the invention.
Figure 3:
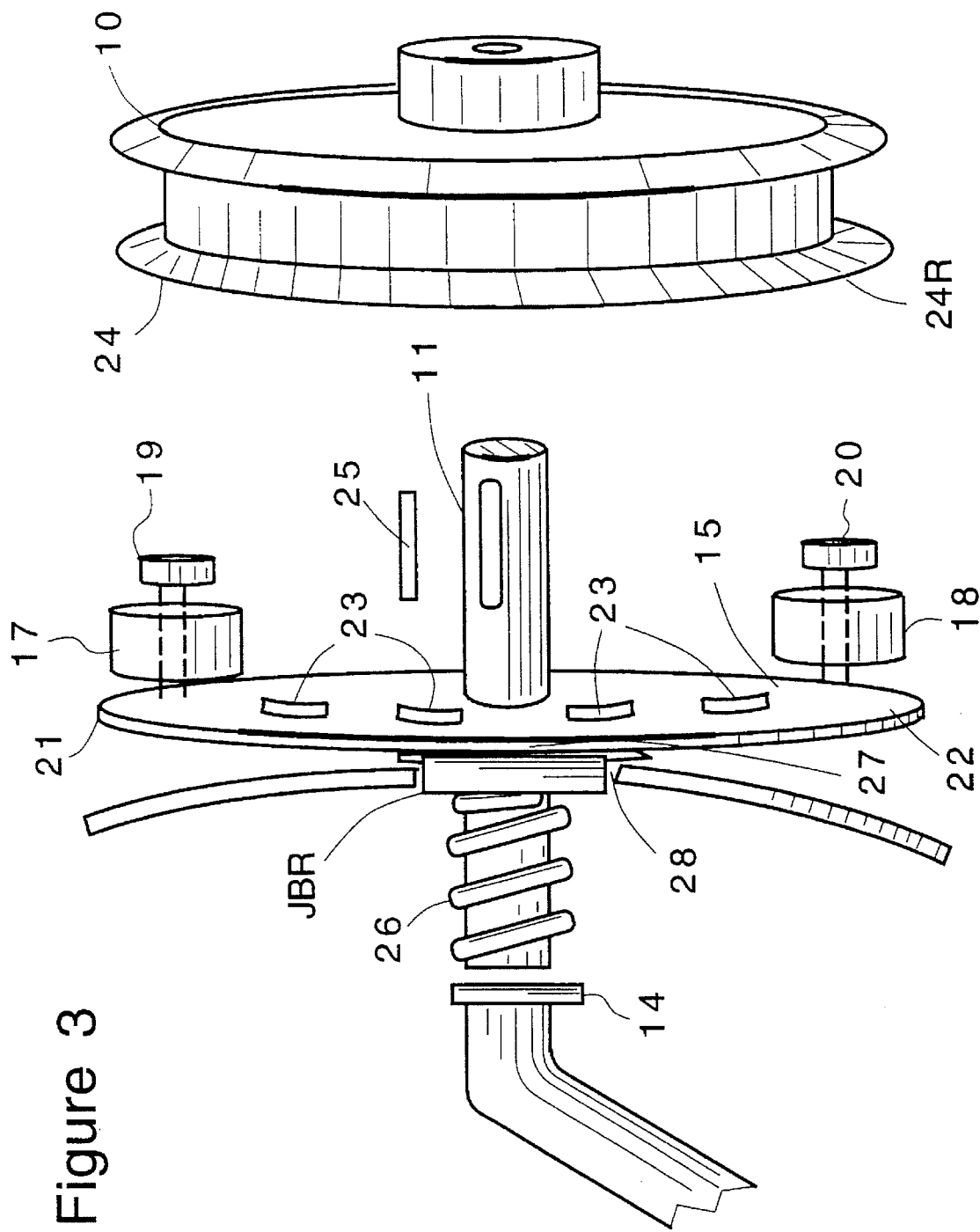
FIG. 3 is a partial exploded view of the driven pulley and carrier plate with idler roller.
Figure 4:
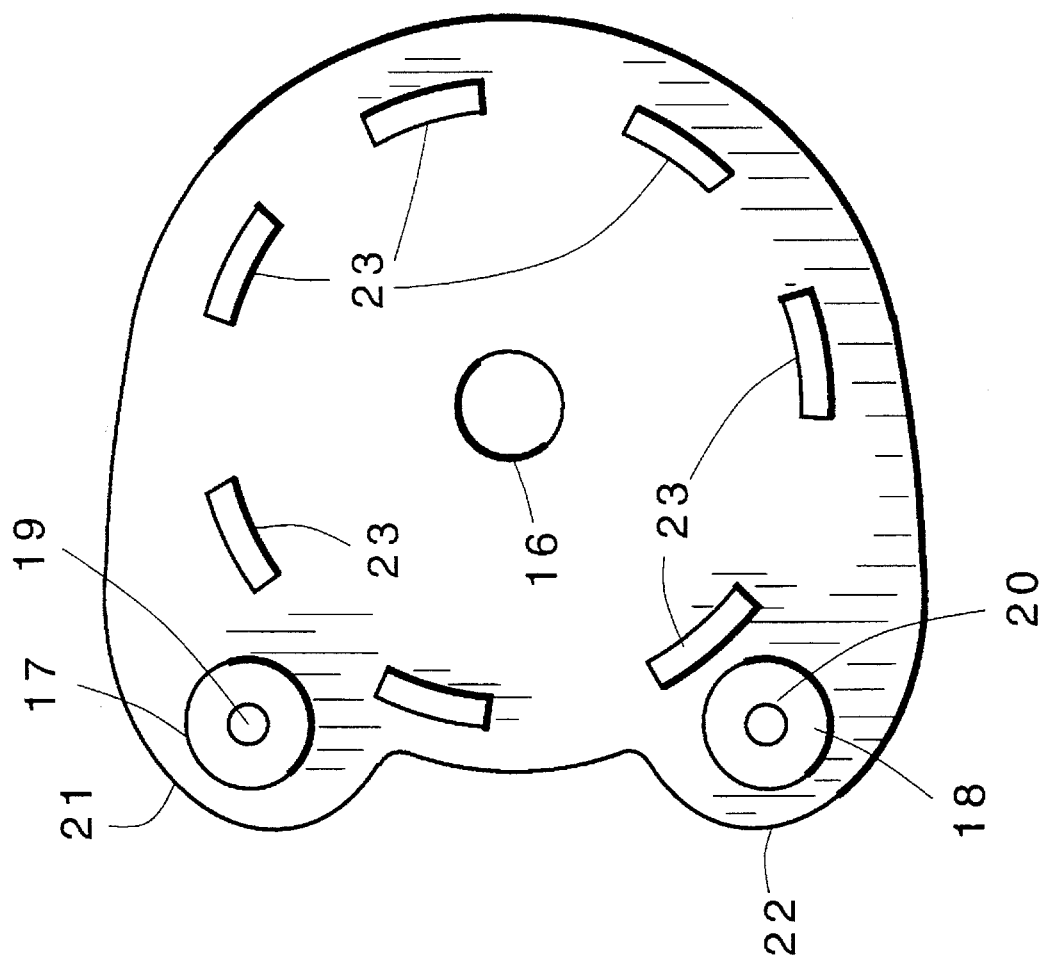
FIG. 4 is a view of the carrier plate and friction engagement mechanism for rotating the carrier plate about the axis of the drive shaft.

The drive mechanism includes a pedal crank mechanism PC which is journaled for rotation in the sides of the body as at JBL and, a similar bearing assembly JBR is provided on the right-hand side of the car. Pedals PEL add PER are conventionally rotatably mounted on the pedal crank shaft PC. A central support (not shown) for the pedal crank shaft PC may be provided for strength. The lateral end of the crank shaft PC projects through the housing or shell or fuselage of the car body on the right hand side in this case, and through a bearing JBR (FIG. 3). A driving pulley 10, preferably of V-shape is securely keyed and locked to the end 11 of crank shaft PC and a belt 12 is trained over the pulley 10, the belt preferably being a V-belt and trained over a similar V-belt pulley 13 which is secured to the right rear wheel. When the belt 10 drives driven pulley 13, the rear wheels WR1, WR1 is driven in a direction depending upon the direction of drive selected by the pedaler, as described more fully hereafter In this embodiment, the fore and aft positions of rear drive shaft 14 and peddle crank shaft end 11 is fixed and the belt 12 is of a length to be slightly slack and no driving force is transmitted to rear axle 14.

The transmission system of the present invention includes means for controlling the tension of the endless flexible belt to transmit power to the driven pulley from drive pulley 10 to selectively provide the following functions:

1) rotation of the driven pulley in a first rotary direction, or 2) rotation of the driven pulley in a rotary direction reverse to the first rotary direction, or 3) braking of the driven pulley, or 4) coasting of a driven pulley.

According to the invention, the means for controlling the tensioning of the flexible endless belt includes a plate member 15 which has a hole 16 through which the pedal crank shaft PC end 11 passes so that the plate 15 is rotatable in a plane parallel to the plane of the driving pulley 10. A pair of idler means such as idler rollers 17 and 18 are mounted on stub axles 19 and 20, respectively, the stub axles 19 and 20 being fixedly mounted in mounting lobes or projections 21, 22 on plate 15. A plurality of friction shoe elements 23 are mounted in a circular array about the axis of hole 16 with the diameter of the axis of the circular array being slightly less than the diameter of pulley 10. It is not necessary that friction shoes 23 be on the same radius - they can have different radiuses. The side or face 24 of pulley 10 facing the plate 15 and friction shoes 23 is relatively smooth and adapted to be engaged by friction shoes 23 and thus the frictional engagement of shoes 23 with the face 24 of pulley 10 will rotate the plate 15 relatively to end 11 of crank shaft PC. For spoked pulleys, the face 24 is constituted by the rim surface 24R. In this embodiment, the friction pads 23 are urged into contact with the side face 24 of pulley 10 so that the plate 15 is immediately responsive to rotation of crank shaft PC, shifting from full drive forward to full drive reverse and those functional positions in between, namely, coast and brake.

As shown in FIG. 3, the housing well 28 of the vehicle supports bearing JBR. Plate 15 is urged by spring 26 via bearing washers 27 to make engagement with surface 24 on driving pulley 10. This makes the plate 15 responsive to movement of the crank shaft and rotates the idler plate 15 and the idler rollers 17 and 18 with sufficient force in one direction or the other so that only one and only one of the idler rollers engages the belt and with sufficient force so as to cause the belt to wrap more around the driving pulley and in a given direction tension the belt sufficiently to cause the transmission of rotary motion to the driven pulley which thereby turns the wheels of the vehicle. Instead of idler rollers, low friction projections may be used. The spring 26 biases the plate 15 in a direction of the surface 24 of driving pulley 10 with sufficient force so as to assure that the friction is sufficient to drive the plate in one direction or the other with sufficient torque to cause one or the other of the idler rollers to engage the belt.

More or less friction pads 23 may be used in this embodiment or, it may be a single circular friction pad. All that is required is sufficient frictional force to rotate the plate 15 in one direction or other so as to apply sufficient tension by one or the other of idler rollers 17 and 18 to cause the belt to wrap more or less around the driving pulley 10. It is contemplated that the plate 15 can be made responsive to rotation of the crankshaft 10 by means other than the friction couple disclosed herein.

Figure 5A:
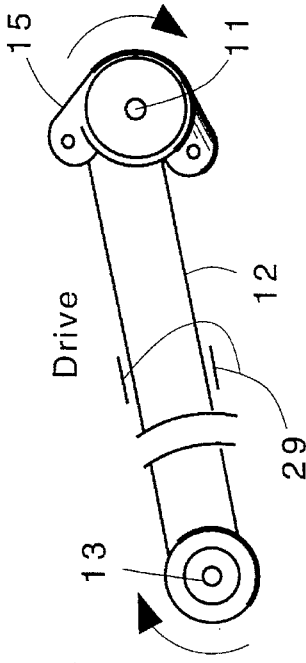
FIGS. 5A, 5B, 5C and 5D illustrate the four operating modes of the invention.
Figure 5B:
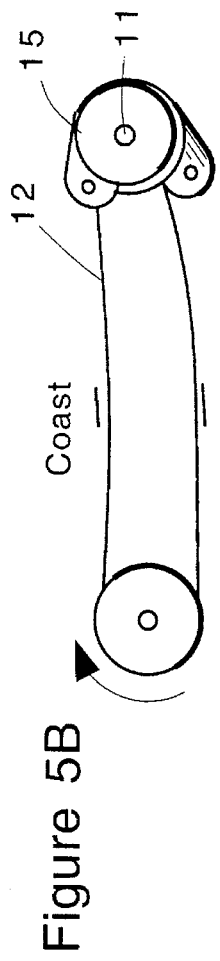

In FIG. 5A, 5B, 5C and 5D, when the plate 15 is rotated in a clockwise direction e.g., the direction of drive, the lower idler roller 18 engages the underside of the drive belt to cause it to wrap more fully around the driving pulley 10 and thereby cause a greater degree of friction between the driving belt and the rear driven pulley and thus drive the vehicle in a forward direction (FIG. 5A).

In the coast position, the plate 15 is in a neutral position so that neither idler roller 17 or 18 is applying force on the belt so that the belt is essentially slack between the two driving and driven pulleys, respectively.

Figure 5C:
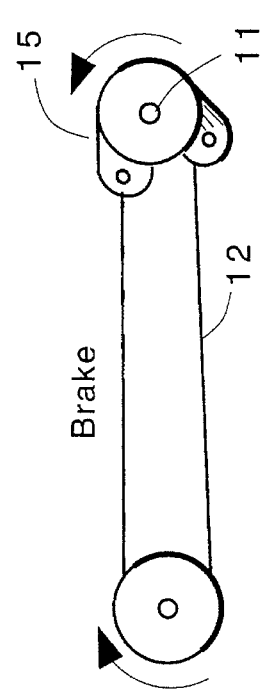
Figure 5D:
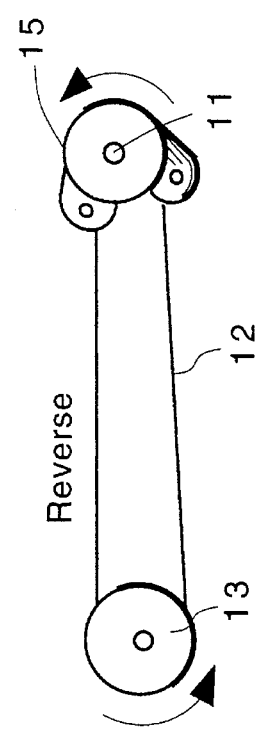

In the braking position, the pedals are urged in a reverse direction to that causing the motion being braked and with just sufficient force to cause the braking action, as indicated in FIG. 5C. In FIG. 5D, the pedaler continues rotating in the reverse direction thereby rotating the plate 15 in a counterclockwise direction causing the upper idler roller 17 to engage the top of the drive belt and thereby cause the tensioning effect as described earlier.

Having thus fully described the invention, it will be appreciated that the objectives set forth earlier herein have all been accomplished, namely, a belt tensioner that will engage the drive belt when either clockwise or counterclockwise energy is applied; that the state of neutral effectively disengages the driving pulley from the driven pulley thus allowing the driven pulley to free-wheel; that an increase in belt wrap for maximum surface contacts increases the load pulling capability; that the invention provides guide for the purpose of retaining the belt in the free-wheeling mode; that the invention provides a tensioner that will automatically compensate for belt wear; that the invention provides a tensioner that requires no rpm build-up such as required for centrifugal clutches; that the invention provides a device that needs only the existing drive shaft for mounting; that the invention provides a tensioner that responds instantly to torque and direction; that the invention provides a device that is simple and light and free from heavy complicated gears and housing; that the invention provides a tensioner that will work equally well as with a fixed pulley or a variable pitch sheave; that the invention provides a device for belt tensioning which does not require complicated hardware or is difficult to implement.

While a preferred embodiments of the invention have been shown, described and illustrated, it will be appreciated that various other modifications, adaptations and improvements to the invention will be readily apparent to those skilled in the art.

What is claimed is:

1. In a transmission system for coupling power from a human rotated drive shaft to a point of utilization, comprising, a driving V-shape pulley secured to said drive shaft, a driven V-shape pulley and output drive shaft at said point of utilization and a flexible endless V-belt extending between said pulleys, the improvement comprising, means responsive to rotation of said human rotated drive shaft for controlling tensioning of said endless flexible V-belt to transmit power to said driven pulley to selectively provide the following functions:
   1) rotation of said driven V-shape pulley in a first rotary direction, or
   2) rotation of said driven V-shape pulley in a rotary direction reversed to said first rotary direction, or
   3) braking of said driven V-shape pulley, or
   4) coasting of said driven V-shape pulley, respectively.

2. The transmission system defined in claim 1, said driven V-shape pulley rotating in a plane, wherein said means for controlling tensioning of said flexible endless V-belt includes a plate member journaled for rotary movement about the axis of said drive shaft and in a plane parallel to the plane of said driving V-shape pulley, and a pair of idler roller means on said plate member for engaging said flexible endless V-belt and provide said functions 1, or 2, or 3, or 4, respectively, and means for causing said drive shaft to rotate said plate member about the axis of said drive shaft such that one of said idler rollers engages said flexible endless V-belt.

3. The transmission system defined in claim 1, said driving V-shape pulley rotating in a plane, wherein said means for controlling tensioning of said flexible endless V-belt includes a plate member journaled for rotary movement about the axis of said drive shaft and in a plane parallel to the plane of said driving V-shape pulley, and a pair of idler roller means on said plate member for engaging said flexible endless V-belt and provide said functions 1, or 2, or 3, or 4, respectively, and friction means on one of said plate member and driving V-shape pulley for causing said driving V-shape pulley to rotate said plate member about the axis of said drive shaft.

4. In a transmission system for coupling power from a human rotated drive shift to a point of utilization, comprising, a driving pulley secured to said human rotated drive shaft, a driven pulley and output drive shaft at said point of utilization and a flexible endless belt extending between said pulleys, said driving pulley rotating in a plane, the improvement comprising, a plate member mounted for rotary movement about the axis of said drive shaft and in a plane parallel to the plane of said driving pulley, a pair of projection means on said plate member for engaging said flexible endless belt and selectively provide the following functions:
   1) forward,
   2) brake,
   3) reverse, and
   4) coast,
respectively, and means responsive rotation of said drive shaft for selectively causing said driving pulley to rotate said plate member about the axis of said drive shaft, and controlling tensioning of said endless flexible belt to transmit power to said driven pulley to selectively provide the said drive functions.

5. The transmission system defined in claim 4, wherein said means for selectively causing said driving pulley to rotate said plate member includes friction means on one of said plates and driving pulley and a facing surface on the other one of said plate and driving pulley and means urging said friction means into engagement with said facing surface.

6. The transmission system defined in claim 5, including a spring for biasing said friction means into engagement with said surface.

7. A pedal vehicle including a pair of rear driving wheels and steerable front wheel means, crank pedals, and a transmission system as defined in one of claims 4, 5, or 6, wherein said crank pedals are on said human rotated drive shaft and said pair of rear wheels are coupled to said output drive shaft.

8. A pedal vehicle as defined in claim 4 having a pair of driving rear wheels and steerable front wheels, crank pedals and a transmission system wherein said crank pedals are on said human rotated drive shaft and said pair of driving rear wheels are coupled to said output shaft.

9. A pedal vehicle as defined in claim 8, wherein said front steerable wheel means is a single wheel.

10. A pedal vehicle as defined in claim 8, wherein said steerable front wheel means includes a pair of steerable wheels.

* * * * *